(12) United States Patent
Agarwal et al.

(10) Patent No.: US 8,745,634 B2
(45) Date of Patent: Jun. 3, 2014

(54) SYSTEM AND METHOD FOR INTEGRATED WORKFLOW SCALING

(75) Inventors: Arvind Agarwal, Bangalore (IN); Sanjay M. Shah, Bangalore (IN); Thomas A. Troy, Lansdale, PA (US)

(73) Assignee: Invensys Systems, Inc., Foxboro, MA (US)

( * ) Notice: Subject to any disclaimer, the term of this patent is extended or adjusted under 35 U.S.C. 154(b) by 532 days.

(21) Appl. No.: 12/905,866

(22) Filed: Oct. 15, 2010

(65) Prior Publication Data

US 2012/0096463 A1    Apr. 19, 2012

(51) Int. Cl.
 G06F 9/46    (2006.01)
 G06Q 10/00    (2012.01)

(52) U.S. Cl.
 USPC ........................................ 718/106; 705/7.13

(58) Field of Classification Search
 None
 See application file for complete search history.

(56) References Cited

U.S. PATENT DOCUMENTS

| | | | |
|---|---|---|---|
| 5,555,504 A | 9/1996 | Lepper et al. | |
| 6,338,074 B1 | 1/2002 | Poindexter et al. | |
| 6,785,692 B2 | 8/2004 | Wolters, Jr. et al. | |
| 6,938,048 B1 | 8/2005 | Jilk et al. | |
| 7,016,940 B2* | 3/2006 | Matsuda et al. | 709/206 |
| 7,069,100 B2 | 6/2006 | Monette et al. | |
| 7,069,101 B1 | 6/2006 | Arackaparambil et al. | |
| 7,117,449 B1 | 10/2006 | Levin et al. | |
| 7,286,888 B2 | 10/2007 | Monette et al. | |
| 7,363,594 B1* | 4/2008 | Wright et al. | 715/751 |
| 7,478,435 B2* | 1/2009 | Sueyoshi et al. | 726/27 |
| 7,634,598 B2 | 12/2009 | Kim et al. | |
| 7,720,572 B2* | 5/2010 | Ziegler et al. | 700/245 |
| 7,783,659 B2 | 8/2010 | Akkiraju et al. | |
| 8,027,859 B2 | 9/2011 | Pulfer | |
| 8,195,709 B2 | 6/2012 | Pulfer | |
| 2006/0167848 A1* | 7/2006 | Lee et al. | 707/3 |
| 2006/0229923 A1 | 10/2006 | Adi et al. | |
| 2006/0235730 A1 | 10/2006 | Politano et al. | |
| 2006/0235737 A1 | 10/2006 | Fleurant et al. | |
| 2007/0143356 A1 | 6/2007 | Kleinsmith et al. | |
| 2009/0204466 A1 | 8/2009 | Nielsen et al. | |
| 2010/0010862 A1 | 1/2010 | Nielsen et al. | |
| 2010/0057240 A1 | 3/2010 | Giebels | |
| 2010/0058114 A1 | 3/2010 | Perkins et al. | |
| 2011/0004830 A1 | 1/2011 | Von Kaenel et al. | |
| 2012/0095585 A1 | 4/2012 | Agarwal et al. | |
| 2012/0095925 A1 | 4/2012 | Agarwal et al. | |

OTHER PUBLICATIONS

Leyman, Frank, "A Practitioners Apprach to Data Federation," IBM Software Group (1999). citeseerx.ist.psu.edu/viewdoc/summary?doi=10.1.1.40.9658.

(Continued)

*Primary Examiner* — Camquy Truong
(74) *Attorney, Agent, or Firm* — Edward S. Jarmolowicz, Esq.

(57) ABSTRACT

A system is provided. The system comprises a first computer located in a first plant, a first memory, and a first object based process management application stored in the first memory. The system further comprises a second computer located in a location separate from the first plant, a second memory, and a second object based process management application stored in the second memory. When executed on the first computer, the first application invokes scripts in response to events and the scripts launch tasks. When executed on the second computer, the second computer invokes scripts in response to events and the scripts launch tasks, one of the events acted on by the second application is a message received from the first application.

13 Claims, 8 Drawing Sheets

(56) References Cited

OTHER PUBLICATIONS

Vanbrabant, Bart, "Federated Access Control and Workflow Enforcement in Systems Configuration," Proceedings of the 23rd Large Installation System Administration Conference (2009). odysci.com/article/1010112987385806/federated-access-control-and-workflow-enforcement-in-systems-configuration.

Wagner, Ralf, "Integration of Workflows into a Federated Database System SQL/MED" (2001). citeseerx.ist.psu.edu/viewdoc/summary?doi=10.1.1.17.3355.

Hergula, Klaudia, "Coupling of FDBS and WfMS for Integrating Database and Application Systems: Architecture, Complexity, Performance," EDBT 2002, LNCS 2287, pp. 372-389 (2002). cse.buffalo.edu/users/azhang/disc/springer/0558/papers/2287/22870372.pdf.

* cited by examiner

SYSTEM AND METHOD FOR INTEGRATED WORKFLOW SCALING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Manufacturing has been the focus of extensive automation efforts. Various automated control equipment has been designed and installed in manufacturing plants to increase productivity and to improve production yields. In some instances, powerful computing technologies have been delivered to the shop floor for use by production line workers and/or managers. Computer based tools have been introduced throughout business enterprises and other organizations.

SUMMARY

In an embodiment, a system is disclosed. The system comprises a first computer system located at a first plant, a first memory, and a first object based business process management (BPM) application stored in the first memory. When executed by the first computer system, the first business process management application automatically executes a first workflow that receives a first input from a human machine interface (HMI) in a first plant, in response to the first input launches a first event, wherein the first event is associated with a first script and wherein launching the first event causes the first script to be executed, the first script assigns a first task associated to a first functional role performed at the first plant, receives a second input associated with the first task, in response to the second input launches a second event, wherein the second event is associated with a second script and wherein launching the second event causes the second script to be executed, the second script transmits a request to launch a second task, accesses a first business process management data store located in the plant, and presents first contextual information accessed from the first business process management data store on a display associated with the first functional role. The system further comprises a second computer system located separate from the first plant, a second memory, and a second object based business process management application stored in the second memory. When executed by the second computer system, the second business process management application automatically executes a second workflow that receives the request to launch the second task, assigns the second task associated to a second functional role performed at the office separate from the first plant, receives a third input associated with the second task, in response to the third input transmits information to the human machine interface that changes the process mediated by the human machine interface in the first plant, accesses a second business process management data store located at an office separate from the first plant, and presents second contextual information accessed from the second business process management data store on a display associated with the second functional role. The first contextual information is not stored in the second business process management data store and wherein the tasks associated with the first workflow are identified as those that take place at the first plant.

In an embodiment, a method of defining a workflow comprised of objects is disclosed. The method comprises opening an application interface associated with one of a manufacturing execution system (MES) application, a product lifecycle management (PLM) application, an enterprise resource planning (ERP) application, or a human machine interface (HMI). The method further comprises, in the application interface, defining a workflow comprising a plurality of tasks, wherein each task is defined as one or more objects. The method further comprises, in the application interface, activating a first control to automatically generate an executable script to be attached to one of the objects, wherein when a first event occurs the executable script executes.

In an embodiment, a system is disclosed. The system comprises a computer system, and at least one memory, and an application stored in the at least one memory. When executed by the computer system, the application automatically executes a workflow that receives a first input from a human machine interface (HMI) in a first plant, in response to the first input generates a first event that assigns a first task associated to a first functional role performed at the first plant, receives a second input associated with the first task, in response to the second input generates a second event that assigns a second task associated to a second functional role performed at an office separate from the first plant, receives a third input associated with the second task, in response to the third input transmits information to the human machine interface that changes the process mediated by the human machine interface in the first plant. The application generates the first event by executing a first script associated with a first instantiated object that receives the first input and generates the second event by executing a second script associated with a second instantiated object that receives the second input.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
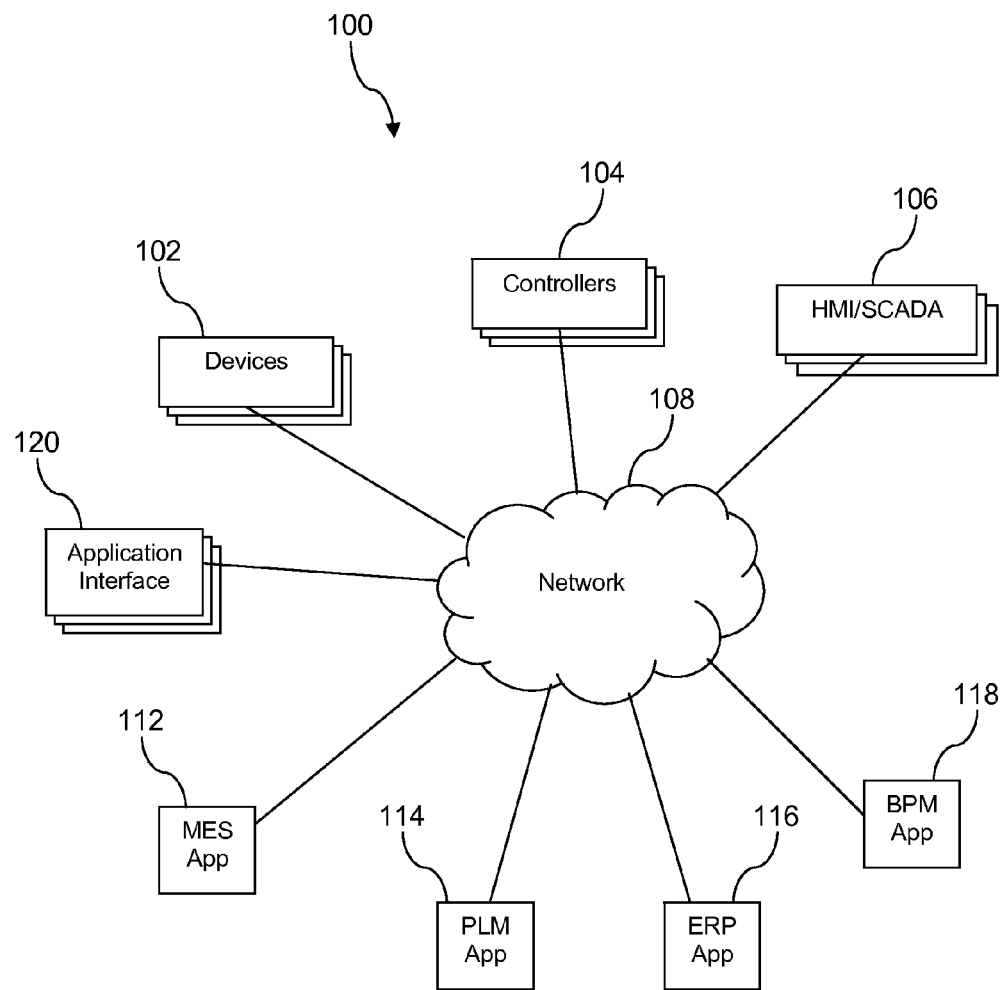
FIG. 1A is an illustration of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method that promote integrated workflow management is taught herein. A business process management (BPM) system provides workflow management that promotes collaboration among people working at different levels of an enterprise or organization, collaboration across disparate processes, and collaboration across disparate computer applications and/or automation systems. In an embodiment, a process control system using an object based method and/or implementation of managing workflows is disclosed. In an embodiment, the BPM system processes events on workflow objects using scripts instead of dynamically generating event objects. The dynamic generation of event objects as a workflow process control system executes may overload a computer system and/or communication network. Additionally, it may be difficult to assure that dynamic generation of event objects may not grow to such an overload point in the future as manufacturing plants expand and scale upwards in size.

The BPM system promotes users defining scripts associated with workflow objects that are executed when an event occurs. Events may occur when control inputs are activated, for example when a machine operator actuates a switch, pushbutton, or selects a button on a user interface. For example, an event may occur when an operator actuates a control of a human machine interface (HMI). An event can occur when a monitored value reaches a threshold, exceeds a predefined threshold, or drops below a predefined threshold. An event can occur when a message is received, for example when an electronic message is sent from a first computer to a second computer or for example when a first computer application invokes an application programming interface call of a second computer application, possibly executing on a different computer system. The scripts may perform a variety of activities including launching other tasks and/or launching other workflows. An interface for creating scripts on workflow objects is part of the interface for defining workflows. A non-technical user may use the subject interface to define both workflows and the scripts. In fact, the users defining the scripts may have no knowledge that a script is being created automatically, behind the scenes as it were, when they use the interface to define different actions that flow from events. The BPM system may be provided by a platform that connects a plurality of process control layers with a production control layer and with a business layer.

Turning now to FIG. 1A, a system 100 is described. In an embodiment, the system 100 comprises a plurality of devices 102, a plurality of controllers 104, a plurality of human machine interfaces (HMI) and/or supervisory control and data acquisition (SCADA) units 106, and a network 108. The system 100 may further comprise manufacturing execution system (MES) application 112, a product lifecycle management (PLM) application 114, an enterprise resource planning (ERP) application 116, a business process management (BPM) application 118, and a plurality of application interfaces 120. It is understood that the system 100 is amenable to a variety of different configurations and distributions of the elements identified above. Some of the possible variations are discussed further below, but further variations are contemplated but not described explicitly in the interest of being concise.

The devices 102, controllers 104, and HMIs 106 may be located in one location, for example within a single manufacturing plant, or they may be distributed across a plurality of locations, for example across a plurality of manufacturing plants. The plurality of locations need not be directed to producing the same products and/or executing the same processes. The devices 102 may comprise a wide variety of sensors, actuators, machines, and other equipment. The devices 102 may comprise pressure sensors, temperature sensors, motion sensors, density sensors, weight sensors, viscosity sensors, accelerometers, servos, and other kinds of sensors. The devices 102 may comprise contactors, switches, and limit switches. The devices 102 may comprise solenoids, motors, valves, heaters, heat exchangers, pumps, fans, boilers, turbines, generators, conveyors, augers, elevators, mills, drills, presses, and other manufacturing equipment. The devices 102 may receive and/or transmit a variety of signals including analog signals and/or digital signals.

The controllers 104 may comprise signal conditioning equipment, programmable logic controllers (PLCs), distributed control systems (DCSs), specialized controllers, and other control equipment. The HMIs 106 may comprise interfaces used by operators to interact with and monitor the devices 102 and/or the controllers 104. The HMIs 106 may comprise interfaces and/or control panels of machines, such as computer numerical controlled (CNC) machines, assembly lines, automated packaging machines, and other machines. The HMIs 106 may further comprise devices and/or systems that may be referred to in some contexts as SCADA systems—systems that one of provide supervisory control and/or acquire data from the devices 102 and/or the controllers 104. In some cases, one or more devices 102, one or more controllers 104, and one or more HMIs 106 may be combined in one integrated machine that may be referred to by workers by a single name. In some contexts, the devices 102 may be referred to as a process control layer 0, the controllers 104 may be referred to as a process control layer 1, and the HMIs 106 may be referred to as a process control layer 2 of the system 100.

In some cases, the devices 102, controllers 104, and HMIs 106 may communicate with each over via the network 108. Alternatively, in some cases a device 102 may communicate directly with a controller 104 or an HMI 106 and may communicate with the network 108 via the controller 104 or the HMI 106. Alternatively, in some cases a controller 104 may communicate directly with an HMI 106 and with the network 108 via the HMI 106. Alternatively, in some cases an HMI 106 may communicate directly with a controller and/or a device 102 and may communicate with the network 108 via the controller 104. The network 108 may comprise one or more of a private network and a public network. The network 108 may comprise local area networks (LANs), wide area networks (WANs), wireless networks, and wired networks. The network 108 may comprise the Internet.

The MES application 112, the PLM application 114, the ERP application 116, and the BPM application 118 may each execute on a dedicated computer system. For example, the MES application 112 may execute on a first computer system, the PLM application 114 may execute on a second computer system, the ERP application 116 may execute on a third computer system, and the BPM application 118 may execute on a fourth computer application, where each of the first, second, third, fourth, and fifth computer systems are different computer systems. Alternatively, one or more of the applications 112, 114, 116, 118 may execute on the same computer system. Computer systems are discussed in greater detail hereinafter. In an embodiment, one or more of the applications 112, 114, 116, 118 may be executed using cloud computing resources.

The application interfaces 120 may execute on a variety of devices including desktop computers, laptop computers, notebook computers, tablet computers, personal digital assistants (PDAs), mobile phones, handsets, and other electronic devices. The application interfaces may comprise an electronic mail (email) application interface, a browser application interface, a simple message service (SMS) application interface, a multimedia message service (MMS) application interface, a graphical user interface (GUI) for use by a user interacting with one of the applications 112, 114, 116, 118, or an interface to yet another application not listed. In an embodiment, a user may work with a desk top computer which may present a variety of application interfaces 120. Alternatively, a user may work with a handset that provides one application interface 120—for example only an interface to the BPM application 118 or an interface to an email application. In an embodiment, an application interface 120 may be provided by a user accessing a web site and receiving hypertext markup language (HTML) content that defines an interface for interacting with an application.

The BPM application 118 promotes defining and executing workflows. Workflows are generally understood by those of skill in the art. Without limitation, a workflow may be considered to comprise one or more steps taken to complete a unit of work. In an embodiment, the BPM application 118 is an open platform that can be extended by enterprises and/or organizations.

A workflow may comprise a plurality of tasks that are each completed by one or more workers. The tasks of a workflow may be related to each other in various ways. The tasks of a workflow may be related serially. For example, a first task may execute and on completion trigger a second task; the second task may execute and on completion trigger a third task; and the third task may execute and on completion the workflow may be completed. The tasks of a workflow may be related in parallel. For example, a fourth task may execute and trigger a fifth task and a sixth task; the fourth task may execute concurrently with the fifth task and the sixth task; the workflow may be completed when each of the fourth task, the fifth task, and the sixth task complete. Workflows that combine serial and parallel tasks are also contemplated. Tasks may generate events, and the events may act as triggers to invoke or launch other tasks that are part of the same workflow. Alternatively, a task in a workflow may generate an event that triggers invocation of a task that begins a different workflow and both workflows continue executing to completion. Some events may be generated automatically by devices 102, controllers 104, HMIs 106, applications 112, 114, 116, 118, and other events may be generated by users interacting with the HMIs 106 and/or the application interfaces 120.

Workflows may comprise a wide variety of processes in an enterprise and/or an organization. Some example workflows are provided here, but it is understood that a very wide variety of workflows are contemplated by the present disclosure. Releasing a new recipe to the plant floor, for example a new recipe for making a breakfast cereal food product, may be a workflow. Scheduling work, for example scheduling a plant work shift by a foreman, may be a workflow. Resolving a quality hold issued against a production item may be a workflow. Releasing finished product to a warehouse may be a workflow. Staging raw materials in a production area may be a workflow. Responding to an adverse alarm condition may be a workflow. Collecting environmental data may be a workflow. The system 100 promotes both executing workflows, for example by employees of an enterprise producing a product, and defining workflows, for example by a manufacturing engineer using an application interface 120 to interact with the BPM application 118 to define tasks, events, and actors that comprise a new workflow to produce a different breakfast cereal food product. In an embodiment, the system 100 provides both a framework and/or open platform for defining and building workflows as well as a platform for executing workflows.

In an embodiment, the BPM application 118 provides queue constructs that may be used for assigning tasks when there are two few agents to service the tasks. The queues may be configured and/or defined as last in first out (LIFO) queues, first in first out (FIFO) queues. Tasks may be assigned and/or dispatched to agents and/or employees fulfilling roles based on round robin allocation, based on least used resource allocation, and other dispatch patterns. Notification of agents and/or employees fulfilling roles may be pushed and/or sent via a variety of channels including via a voice telephone call, via a simple message service (SMS) message, via a multimedia message service (MMS) message, via an email, via an instant message, and via other communication channels. The agent and/or employee fulfilling a subject role may be notified in one of the application interfaces 120.

In an embodiment, the BPM application 118 provides for end-to-end institutionalization of business processes across a hierarchy of people and across systems within the enterprise and/or organization. The BPM application 118 promotes knowledge management across the enterprise and/or organization by providing standardized approaches to normal and/or unscheduled events. The BPM application 118 promotes adaptation and deployment either across business units, for example a plurality of manufacturing plants, or constrained to a single business unit, for example a single manufacturing plant. In an embodiment, the BPM application 118 may be provided by an ARCHESTRA workflow software, In some contexts, the MES application 112 may be referred to as the production control layer of the system 100. The MES application 112 may provide automation for collection of production information, analysis of production information, shipping and dispatch of product, product traceability, and other automated functionality. The MES application 112 may provide a plurality of predefined application programming interface (API) calls to execute different production management tasks within a manufacturing organization. Additionally, the MES application 112 may provide a capability for extending the APIs by providing the ability to link custom business logic and/or script to the beginning or end of an existing API call. The API calls may be invoked to signal events and/or generate events in the system 100. A user may push a switch or select a control on an application interface 120 to invoke an appropriate API call. An automated procedure, likewise, may automatically invoke an API call. For example, upon completion of labeling a pallet for shipment to a customer, a load dock employee may select the complete icon on an HMI 106, and the HMI 106 may invoke a "shipment labeling complete" API call of the MES application 112. The API calls may complete tasks in the workflow and/or launch other tasks in the workflow.

The PLM application 114 may provide functionality for one or more of product conceptualization, product design, product realization, and product service and/or logistics. Information about how the product is manufactured or built, for example specifications, may be created and maintained in the PLM application 114. The PLM application 114 may describe the engineering and/or technical aspect of the product. For example, a recipe for producing a breakfast cereal food product may be defined in a specification in the PLM application 114. The ERP application 116 may provide functionality for automated management and/or planning of resources relevant to the enterprise and/or organization. For example, the ERP application 116 may track raw materials on hand, product inventory, and determine when and how much raw material is needed in the future based on current sales and product inventory.

The BPM application 118 is employed to automate complex business processes across disparate business applications and organizations. This functionality may generally be referred to as business process management (BPM). BPM views the enterprise from an end-to-end process perspective. The BPM defines and manages how business activities are executed, including the interaction of people and/or systems. BPM may comprise modeling, execution, analysis, and improvement. Modeling may comprise modeling processes, forms, reports, data, and other items. Execution may mean executing the model, worker activities and participation in processes, and escalation of problems. Analysis may comprise analyzing the processes, identifying process bottlenecks, receiving alerts, and other. Improvement contemplates feeding back the results of analysis into the modeling and execution aspects of BPM in a continuous improvement cycle that promotes agile adaptation of the business and/or enterprise to current and evolving business conditions. One or more components of BPM may be supported by other applications and/or systems.

In some contexts, the BPM application 118, the ERP application 116, the PLM application 114, and other applications may be referred to as a business layer of the system 100. In an embodiment, the business layer may be provided by computers located at a corporate headquarters or using cloud computing resources provided by third party cloud computing vendors. In an embodiment, the MES application 112 and/or the BPM application 118 may be provided in a distributed manner by computers located in one or more manufacturing plants. Alternatively, the MES application 112 and/or the BPM application 118 may be provided in a centralized manner by computers located in the corporate headquarters or using cloud computing resources provided by third party cloud computing vendors. Alternatively, one or more of the applications 110, 112, 114, 116, 118 may execute at one or more business locations away from both the corporate headquarters and the manufacturing plants. In an embodiment, the BPM application 118 connects the process control layers (process control layer 0, process control layer 1, and process control layer 2) with the production control layer and with the business layer.

The MES application 112, the PLM application 114, and the ERP application 116 are unified by the BPM application 118 that promotes appropriate collaboration of workers from the top of the enterprise or organization to the bottom of the enterprise or organization. The BPM application 118 supports a vice president or other executive working in his corner office at the corporate headquarters completing his task that forms part of a workflow, a operations manager at the manufacturing plant completing her task that forms part of the same workflow, and a mixing machine operator completing his task that forms part of the same workflow. The BPM application 118 promotes collaboration not only of people at all levels within the enterprise and/or organization but also collaboration across systems, for example across the applications 112, 114, and 116. Further, the BPM application 118 promotes contextualization of information so workers interact with the system 100 and/or the BPM application 118 using an interface they are comfortable with and familiar with and presents information appropriately for their needs and responsibilities. Further details may be found in U.S. patent application Ser. No. 12/906,064 filed this same day and entitled "System and Method for Workflow Integration," by Arvind Agarwal, et al., and in U.S. patent application Ser. No. 12/905,860 filed this same day and entitled "System and Method of Federated Workflow Data Storage," by Arvind Agarwal, et al., both of which are incorporated herein by reference for all purposes.

Design time contextualization is promoted by the system 100. In an embodiment, the application interfaces 120 provide or embed an interface for designing workflow and/or workflow events. The interface for designing workflow and/or workflow events is exposed within the application interfaces 120, thereby empowering workers to design and interact with workflow within the application interface 120 with which they are most familiar and/or most comfortable. This saves the trouble of having to open a special workflow interface—possibly an interface that remains intimidating and/or unfamiliar due to the infrequency with which a worker may access the interface—and having to export designs. This saves the trouble of bringing up, logging in, and logging out of special interfaces. From within the exposed interface contextual parameters that are desired to be coupled to and/or stored in events can be defined and specified. These contextual parameters will be carried through the workflow with the subject event.

Figure 1B:
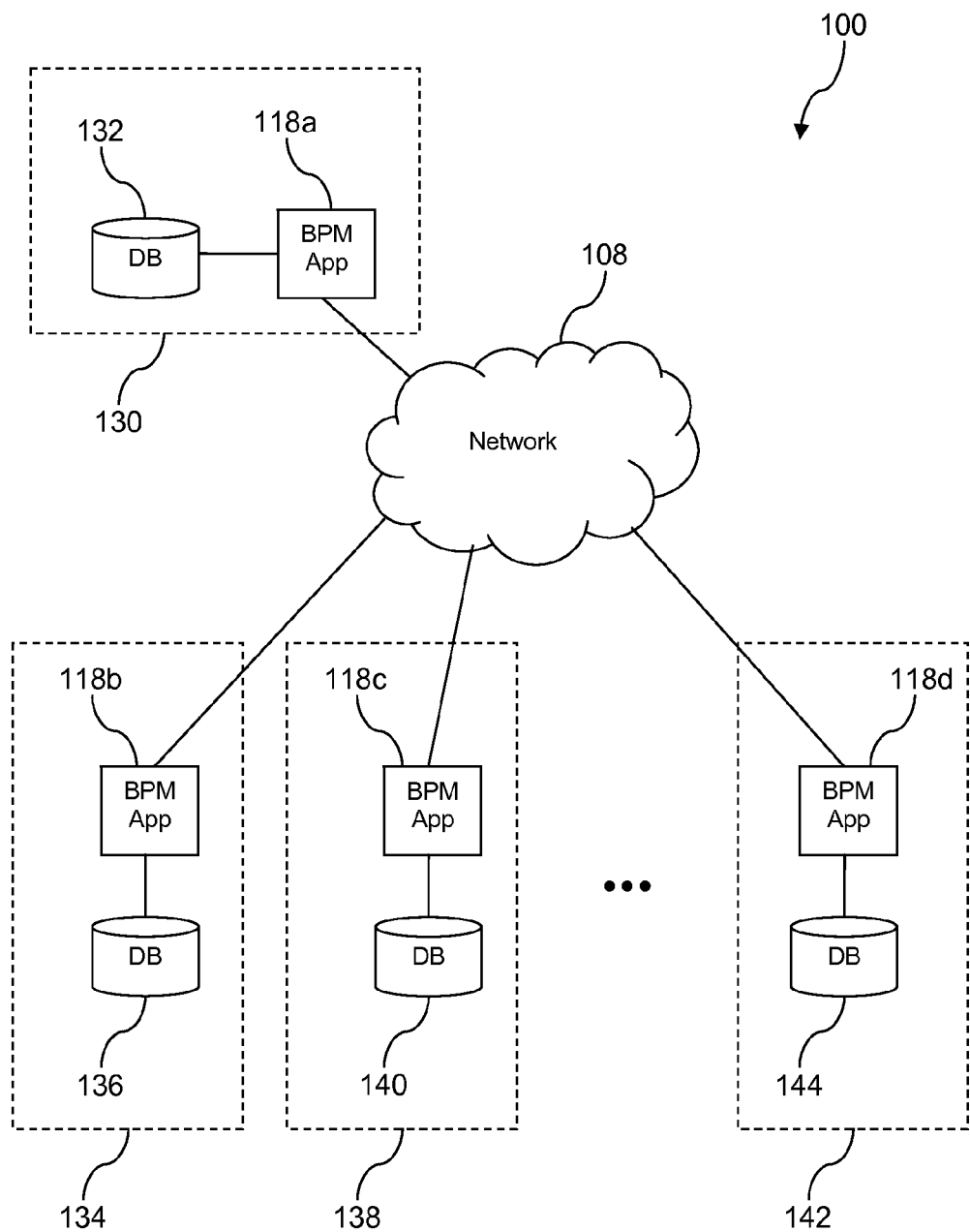
FIG. 1B is an illustration of a plurality of business process management applications and business process management data stores according to an embodiment of the disclosure.

Turning now to FIG. 1B, further details of distribution of business process management functionality is described. In an embodiment, the system 100 may comprise a centralized BPM application 118*a* that executes on a computer system in a central location 130 and which interacts with a centralized BPM data store 132; a first local BPM application 118*b* that executes on a computer system in a first remote location 134 and interacts with a first remote BPM data store 136; a second local BPM application 118*c* that executes on a computer system in a second remote location 138 and interacts with a second remote BPM data store 140; and a third local BPM application 118*d* that executes on a computer system in a third remote location 142 and interacts with a third remote BPM data store 144. The BPM data stores 132, 136, 140, 144 may be said to store data or data items. The central location 130 may be a corporate headquarters or another office location. In an embodiment, the central location 130 may be a cloud computing resource provided by a third party vendor of cloud computing resources. The remote locations 134, 138, 142 may be manufacturing plant locations, district and/or regional offices, warehouses, and the like. While three remote locations 134, 138, 142 are shown in FIG. 1B, it is understood that the present disclosure contemplates any number of remote locations, for example one remote location, two remote locations, or more than three remote locations.

It is understood that the other components illustrated in FIG. 1A are considered to be part of the system 100 illustrated in FIG. 1B, but all the components are not illustrated to avoid cluttering FIG. 1B. It is understood, for example, that the devices 102, the controllers 104, and the HMI 106 may be present in one or more of the remote locations 134, 138, 142. Additionally, it is understood that an instance of the MES application 112 may execute on a computer system in one or more of the remote locations 134, 138, 142. For example, a first MES application 112 may execute on a first computer system in the first remote location 134 and a second MES application 112 may execute on a second computer system in the second remote location 138. The BPM application 118 may execute partly as a centralized application on a computer system in the centralized location 130 or a different centralized location from the centralized BPM application 118a as well as partly as a distributed application on one or more computer systems in the remote locations 134, 138, 142. The PLM application 114 and the ERP application 116 may execute on one or more computer systems in the centralized location 130 or other centralized locations.

In an embodiment, the BPM applications 118b, 118c, 118d that execute on computer systems in the remote locations 134, 138, 142 may be different from the BPM application 118a that executes on the computer system in the centralized location 130. The BPM applications 118b, 118c, 118d that execute at the remote locations 134, 138, 142 may, for example, perform operations to periodically push information from the remote BPM data stores 136, 140, 144 up to the centralized BPM data store 132 when communication links between the BPM applications 118b, 118c, 118d are established with the network 108. During communication link outages, the BMP applications 118b, 118c, 118d may keep track of what data needs to be synchronized up to the centralized BPM data store 132 when next the communication link is restored. For example, the BPM applications 118b, 118c, 118d may aggregate data deltas that continue to aggregate and/or accumulate until the period for synchronizing the data delta to the centralized BPM data store 132 or, if there is a link outage at the time the synchronization period occurs, synchronizing when next the communication link between the BPM application 118b, 118c, 118d to the network 108 is established.

The BPM applications 118b, 118c, 118d may distinguish between data stored in the BMP data that is desirably synchronized up to the centralized BPM data store 132 and data that may remain local and is not updated to the centralized BPM data store 132. Such local BPM data may be retrieved by the BPM application 118a on a request basis. The system of managing BPM data as local BPM data and centralized BPM data and BPM data that is periodically synchronized versus BPM data that is asynchronously updated to from the local BPM data store 136, 140, 144 to the centralized BPM data store 132 on the event of the local data being updated promotes managing the complexity and network communication burden of the system 100. In some contexts this may be referred to as providing global control of some BPM data while providing local control of other BPM data.

The data that is synchronized to the centralized BPM data store 132 and/or data that is asynchronously transmitted to the centralized BPM data store 132 from the local BPM data store 136, 140, 144 on the event of the local data being updated may comprise key performance indicators (KPI). Such KPI may be deemed of increased importance for monitoring and/or quantifying the workflow processes in the locations 134, 138, 142. Alternatively, the KPI may be deemed to be of increased importance because they represent conditions that have a bearing on safety in the locations 134, 138, 142. Other information that does not constitute KPI may be accumulated in the local BPM data stores 136, 140, 144 and accessed when desired by the BPM application 118a or copied to the centralized BPM data store 132 by another process, for example a batch process that executes in the background and/or late at night and/or on the weekends.

Figure 2:
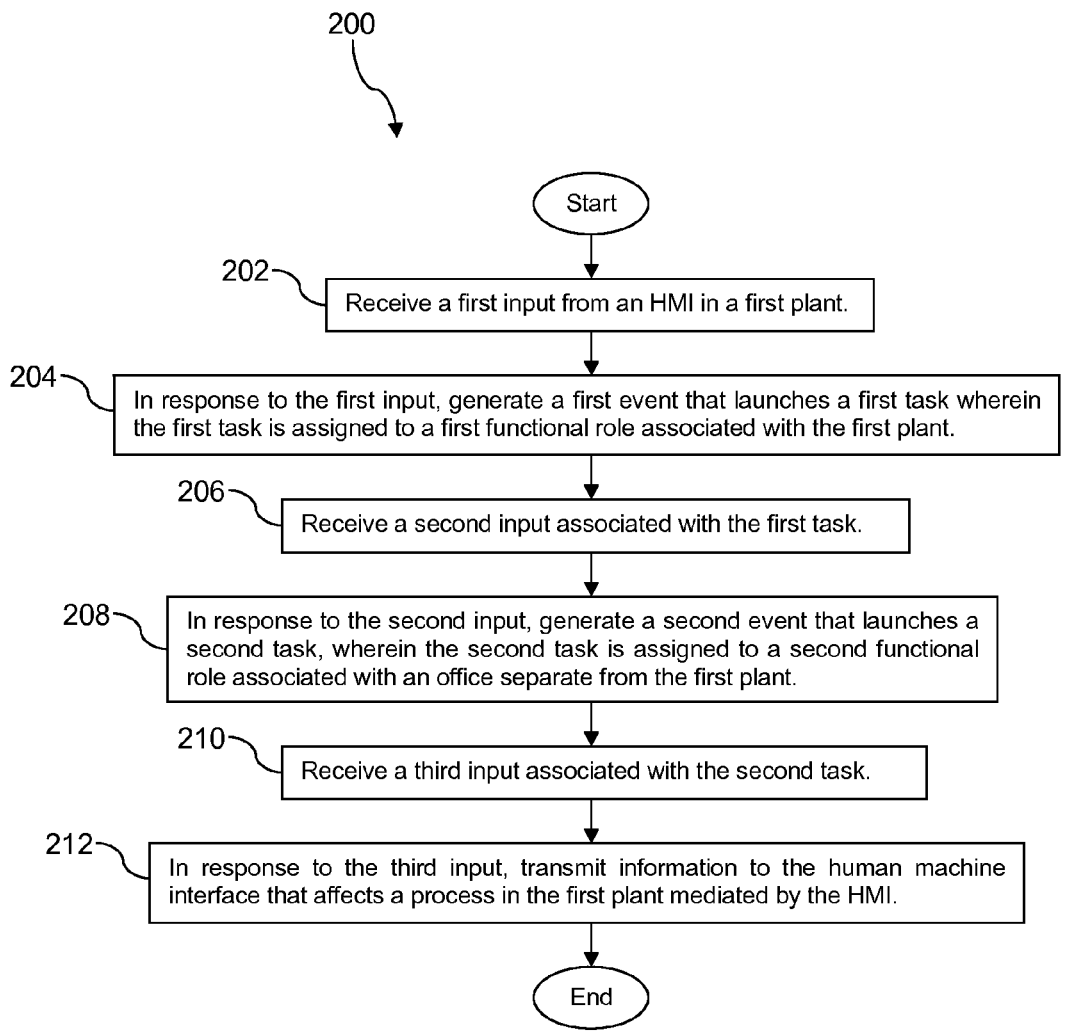
FIG. 2 is a flow chart of a method according to an embodiment of the disclosure.

Turning now to FIG. 2, a method 200 is described. At block 202 a first input from an HMI 106 is received in a plant, in an enterprise, or in an organization. The input may be a selection of a control input in a page presented by the HMI 106 on a display screen, for example a control input to begin a task, a control input to complete a task, a control input to command a device to do something, or another kind of input. At block 204, in response to the first input, a first event is generated. For example, a first event is transmitted to the BPM application 118. In an embodiment, this may involve invoking a script of an object associated with the workflow and/or an object associated with a task in the workflow and/or an object associated with a device that participates in some way in the workflow. Alternatively, in another embodiment, this may involve dynamically creating an event object, possibly executing an initialization method of the event object that sends a message to the BPM application 118. The first event launches or causes to be launched a first task. The first task is assigned to a first functional role. For example, the first functional role may be performed by a worker at a middle level of the enterprise or organization. The role, for example, may be assembly line foreman, quality assurance engineer, quality assurance supervisor, plant operations manager, or other. In an embodiment, multiple individuals may equally fill the subject role, and responsibility for handling the first task may be automatically assigned to specific individuals based on current workload, work schedule, vacation schedule, sick leave, and other. In an embodiment, the BPM application 118 may assign the first task.

At block 206, a second input is received associated with the first task. The second input may be a selection of a control input in a user interface presented by one of the application interfaces 120, for example a control input related to the BPM application 118 or other application 112, 114, 116. At block 208, in response to the second input, a second event is generated, and the second event launches or causes to be launched a second task. The second task is assigned to a second functional role. For example, the second functional role may be performed by a worker at a middle or upper level of the enterprise or organization. The second functional role may comprise, for example, plant manager, industrial engineer, director, or vice president, or other role. The BPM application 118 may assign the second task to an individual based on current workloads, work schedules, vacation schedules, sick leave, or other considerations.

At block 210, a third input is received associated with the second task. The third input may be a selection of a control input in a user interface presented by one of the application interfaces 120. At block 212 in response to the third input, information is transmitted to the HMI 106 of step 202 that affects a process in the plant, enterprise, or organization. For example, the information may comprise a change to a manufacturing specification. The information may comprise a new definition of a task performed in association with the HMI 106 of step 202. While the method 200 was described in terms of workers at different levels of an enterprise or organization taking part in the workflow, in another circumstance the workers may be at the same level—for example all at the shop floor level or all at the assembly line worker level—but have different responsibilities and/or roles in the end-to-end process or workflow.

Figure 3:
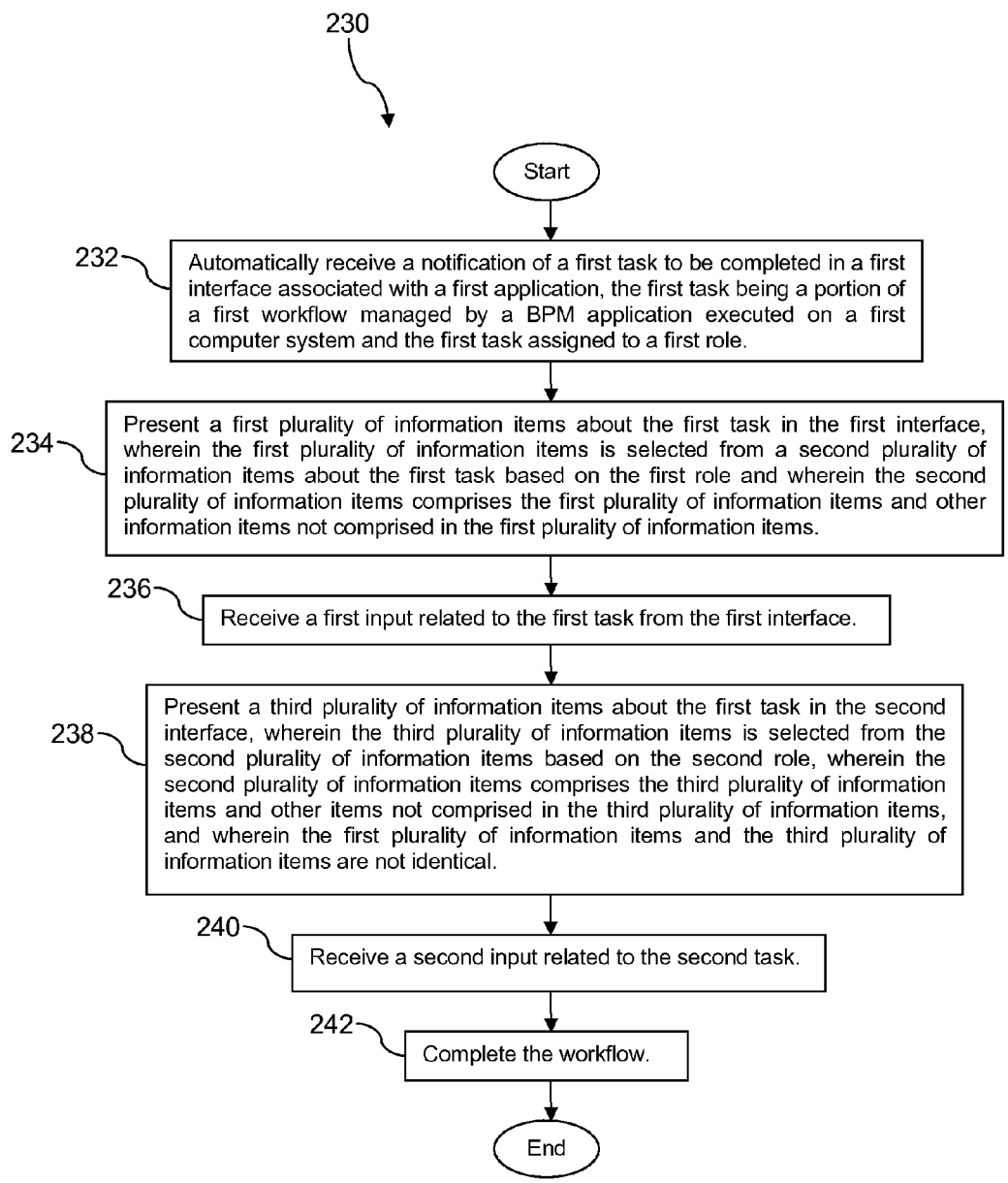
FIG. 3 is a flow chart of a method according to an embodiment of the disclosure.

Turning now to FIG. 3, a method 230 is described. At block 232, a notification of a first task to be completed is received in a first interface associated with a first application. For example, a notification of a task to be completed is received in a screen of one of the application interfaces 120. The first task is part of a first workflow managed by the BPM application 118 and is assigned to a first role. The BPM application 118 executes on a first computer system, for example a dedicated server computer and/or in a cloud computing environment.

At block 234, a first plurality of information items about the first task is presented in the first interface. The first plurality of information items is selected from a second plurality of information items about the first task. The second plurality of information items comprises the first plurality of information items and other information items not comprised in the first plurality of information items. In some contexts, the first plurality of information items may be referred to as a subset of the second plurality of information items. The selection is selected based on the first role. The information items may include information about devices, information about states of devices, information about materials, information about progress of a process, information defining how to perform a process or a task, and other information. The information may include specifications for performing a task or a process. The first plurality of information items may comprise those information items that are deemed to be significant for a first worker assuming the first role and performing the first task. The selection of the first plurality of information items may omit information items that are of no use to the first worker or that are not appropriate for the level of trust or responsibility associated to the first role. For example, a worker fulfilling book orders in a distribution center may see details of addressing and date of book order input but details of payment method and financial information associated with the book order may be blocked and hidden from the worker.

At block 236, a first input related to the first task is received from the first interface. At block 238, a third plurality of information items about the first task are presented in a second interface. The third plurality of information items is selected from the second plurality of information items. The second plurality of information items comprises the third plurality of information items and other information items not comprised in the third plurality of information items. Under some circumstances, the first plurality of information items and the third plurality of information items may not be identical. At block 240, a second input related to the second task is received. At block 242, the workflow is completed. In some circumstances, completion of the workflow may involve sending events to one or more roles associated with the workflow as well as sending an event to the BPM application 118. In an embodiment, completion of a workflow and/or completion of a task may invoke automated scripts that perform automated activities. For example, upon completion of a task and/or a workflow, data associated with the task and/or workflow may be stored to a data store and/or to a historian application. For example, upon completion of a task and/or workflow, process metrics calculation may be invoked to update metrics. For example, upon completion of a task and/or workflow, the outcome of the task and/or workflow may be compared to thresholds, and if a threshold is exceeded an alarm condition may be identified and a notification of the alarm condition may be sent out to one or more roles and/or workers.

Figure 4:
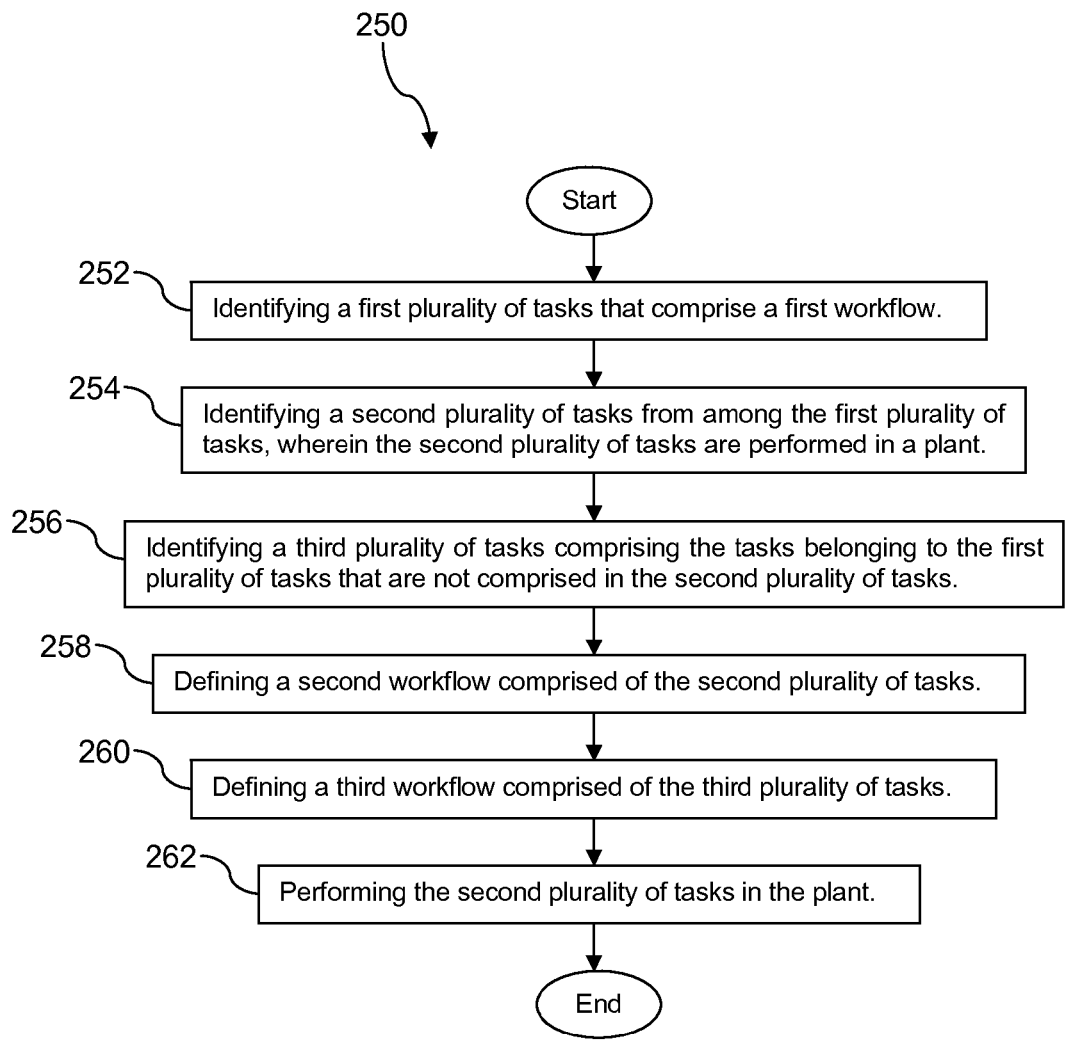
FIG. 4 is a flow chart of a method according to an embodiment of the disclosure.

Turning now to FIG. 4, a method 250 is described. At block 252, a first plurality of tasks are identified that comprise a first workflow. At block 254, a second plurality of tasks are identified from among the first plurality of tasks, wherein the second plurality of tasks are performed in a plant. For example, the second plurality of tasks may be executed in one of the remote locations 134, 138, 142. In some contexts, it may be said that the second plurality of tasks is a subset of the first plurality of tasks. At block 256, a third plurality of tasks are identified comprising the tasks belonging to the first plurality of tasks that are not comprised in the second plurality of tasks.

At block 258, a second workflow is defined to comprise the second plurality of tasks. At block 260, a third workflow is defined to comprise the third plurality of tasks. At block 262, the second plurality of tasks is performed in the plant, for example in one of the remote locations 134, 138, 142. In an embodiment, the third workflow may be performed at the centralized location 130 and the first workflow may be conceived to be the end-to-end combination of the second workflow and the third workflow. The first workflow may be partitioned in this way to promote work being completed at one of the remote locations 134, 138, 142 when communications with the centralized location 130 may be out of service.

Figure 5:
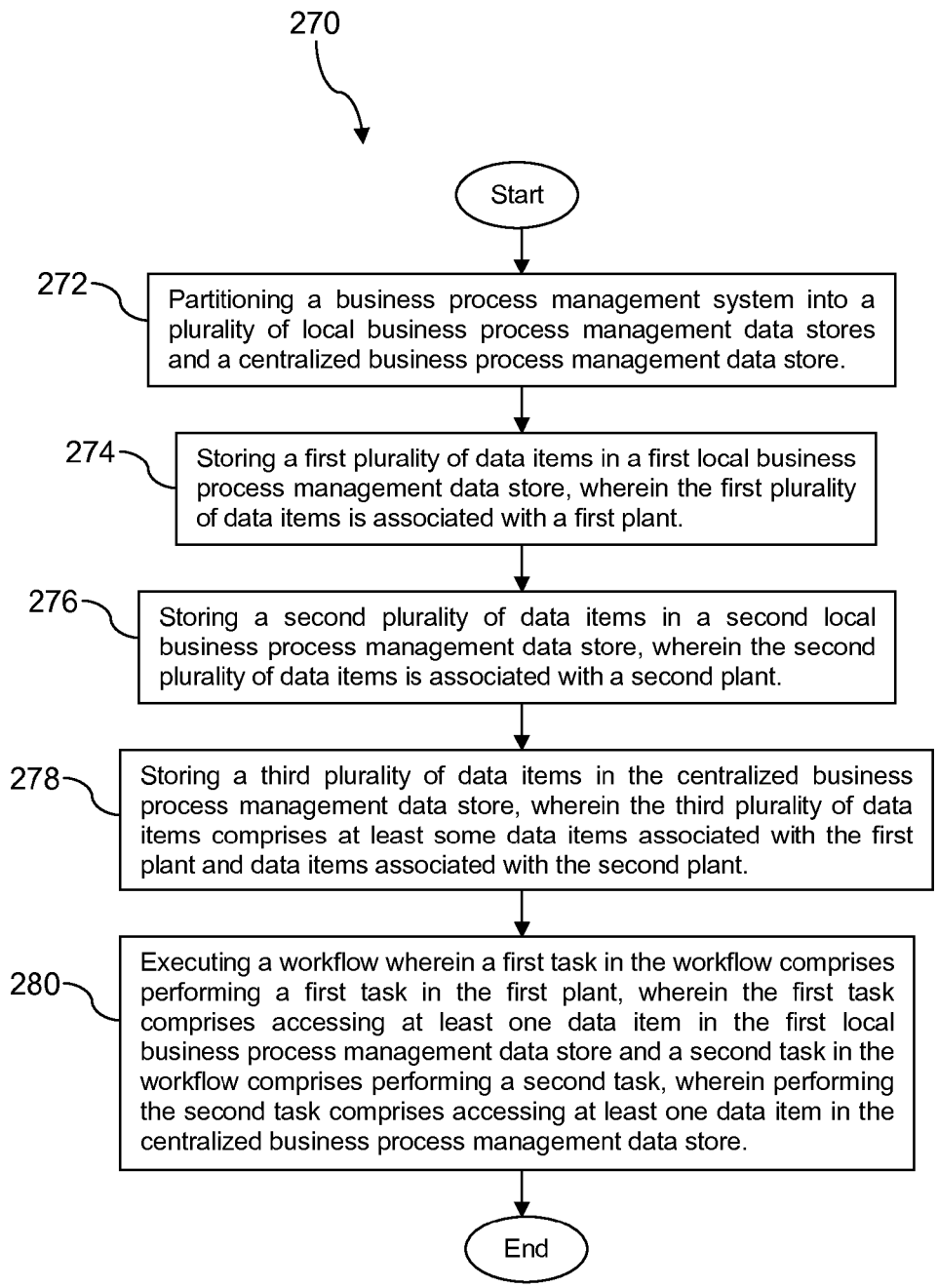
FIG. 5 is a flow chart of a method according to an embodiment of the disclosure.

Turning now to FIG. 5, a method 270 is described. At block 272, a business process management system is partitioned into a plurality of local business process management data stores and a centralized business process management data store. For example, the system 100 is partitioned into the centralized BPM data store 132 and the remote BPM data stores 136, 140, 144. At block 274, a first plurality of data items in a first local business process management data store, for example in the local BPM data store 136, wherein the first plurality of data items is associated with a first plant, for example the remote location 134. At block 276, a second plurality of data items is stored in a second local business process management data store, for example in the local BPM data store 140, wherein the second plurality of data items is associated with a second plant, for example the remote location 138. At block 278, a third plurality of data items is stored in the centralized business process management data store, for example in the centralized BPM data store 132, wherein the third plurality of data items comprises at least some of the data items associated with the first plant and the data items associated with the second plant.

At block 280, a workflow is executed wherein a first task in the workflow comprises performing a first task in the first plant, wherein the first task comprises access at least one data item in the first local business process management data store and a second task in the workflow comprises performing a second task, wherein performing the second task comprises accessing at least one data item in the centralized business process management data store.

It is contemplated that the system 100 may be usefully employed in a wide range of enterprises and/or organizations. The system 100 may be used in a manufacturing plant, in a food manufacturing plant, in a beverage manufacturing plant, in a chemical manufacturing plant, and in an oil refinery. The system 100 may be used in enterprises that are not directly involved in manufacturing and/or producing physical products. The system 100 may be used in organizations, for example insurance companies, health organizations, and other organizations. Likewise, it is contemplated that the system 100 may promote execution of hundreds of different workflows. Some examples of workflows are provided below to illustrate some of the interactions supported by the system 100, but many, many more scenarios are contemplated.

In a first example use scenario, a positive quality assurance release process is promoted by the system 100. A first worker "Bill" determines that he has produced the target amount of product required for a particular production order. Bill accesses an interface to the MES application 112 and inputs an indication that the packaging order is complete. The MES application 112 invokes an application programming interface (API) call to complete the job at the packaging operation and executes customized logic that is hooked into the API call. The customized logic was created by an employee who has no specialized computer programming knowledge and/or experience using a graphical user interface of the MES application 112. The customized logic queries a data store associated with the MES application 112 to determine if all of the jobs have been completed for the subject production run. If so, the customized logic invokes a positive quality assurance release workflow in the BPM application 118.

When the positive quality assurance release workflow is invoked, the BPM application 118 sends a task to a second worker "John" to review and approve the data that has been collected for the subject production order. John accesses his task via an interface to the MES application 112. The interface John uses to access the MES application 112 may be different from the interface that Bill uses to access the MES application 112. Each worker can access and interact with the MES application 112 in the context that is appropriate and/or preferred by each worker. When John accesses his task, perhaps selecting the subject task from a list of tasks currently assigned to John, the MES application 112 retrieves and presents appropriate production data and/or records. The data and/or records may be retrieved from the data store associated with the MES application 112 and/or from a third party quality management application. The production data and/or records may be referred to in some contexts herein as information items. The production data and/or records may be presented in a form that highlights areas of non-conformance, if any non-conformance exists.

If a non-conformance exists, John enters a recommended resolution. Once John has entered his recommended resolution, he closes the form, and the BPM application 118 sends a task to a third worker "Dave" to review and approve/disapprove John's recommendation. Dave accesses his task through an application interface 120 that suits him and his work style, for example through an email. Dave accesses the email message, selects an embedded link in the email that retrieves the form filled in by John. Dave will approve or reject John's recommendation.

If Dave approves, the BPM application 118 sends an email message embedding a link to the form to a fourth worker "Jay" informing him of the resolution; invokes an API call on the MES application 112 to change the status of the production order to released; sends a message to a third party warehouse management application that the production order is ready to be shipped; and terminates the workflow.

If Dave rejects, the BPM application 118 sends an email message embedding a link to the form to Jay informing him of the release issue; invokes an API call on the MES application 112 to change the status of the production order to under quality assurance review; and sends a message back to John asking him to revise his resolution recommendation or provide further supporting information and/or arguments for his original recommendation.

In a second example use scenario, a material inspection and quality hold resolution process is promoted by the system 100. Bill has started a particular production run at a packaging line using a work queue control using one of the application interfaces 120 to the MES application 112. Bill needs to stage some bottles in the filler and activates a material inspection form. The material inspection form invokes an instance of a material inspection workflow in the BPM application 118. The material inspection form displays the visual characteristics that need to be inspected prior to staging the bottles at the production line. The form retrieves the visual inspection characteristics from a data store coupled to the MES application 112. Bill is prompted by the material inspection form to enter one of pass or fail.

Bill notices that the color of the bottles does not comply with the visual inspection characteristics specified by the form and enters fail along with further comments associated with his visual inspection of the bottles. When Bill closes the form, the MES application 112 invokes an API call to change the state of the subject raw material lot to quality hold review and causes the BPM application 118 to send a task via email to Jay to resolve the quality hold. Jay accesses the email in his email tool on his desktop computer. Jay selects a link in the email message to access the form. Jay may resolve the quality hold or return the raw material to the vendor.

If Jay chooses to return the raw material to the vendor, the BPM application 118 sends an email to a fifth worker "Sue" including supporting information and directing Sue to initiate a RMA process with the vendor and invokes an API call on the MES application 112 to change the status of the raw material lot to returned to vendor. The workflow terminates. If Jay chooses to resolve the quality hold, an API call on the MES application 112 changes the status of the raw material lot to approved. The workflow terminates.

In a third example use scenario, a packaging line setup process is promoted by the system 100. Bill initiates a new production order on a packaging line using one of the application interfaces 120 to the MES application 112. The MES application 112 invokes an API call to start the packaging line setup job. The MES application 112 changes the utilization state of the subject production line to line setup and invokes an API call to create two dynamic procedures and/or tasks—one task for each of Bill and a sixth worker "Len"—that guides Bill and Len through the steps of setting up the packaging line. The subject tasks are presented on handheld devices that Bill and Len use in their work. The handset devices may be an HMI 106. As portions of their tasks are completed, Bill and Len input completion steps into their handheld devices. Both Bill and Len follow the setup procedures presented to them. This coordinates their work and prevents either duplication of effort or portions of set-up that are left uncompleted because each assumed the other worker had completed that step. The line setup workflow waits on completion of both Bill's task and Len's task before determining that the workflow is completed. The BPM application 118 invokes an API call on the MES application 112 to change the utilization state of the production line to running and terminates the workflow.

In a fourth example use scenario, a specification data change management process is promoted by the system 100. Bill has started a production run at the packaging line using an application interface 120 of the MES application 112. The MES application 112 downloaded a specification to the programmable logic controller controlling the packaging machine, for example one of the controllers 104 controlling one of the devices 102. As the production run progressed, Bill found that the line experienced jams. Bill experimented with changing the belt speed of the line and found a belt speed that differed from the specified belt speed but resulted in decreased jamming.

Bill selects a specification change request form to display on his application interface 120. The MES application 112 causes a specification change request workflow to be invoked by the BPM application 118 and a specification change request form to display on the application interface 120. Bill inputs the desired specification change for belt speed into the form and closes the form. The MES application 112 causes the BPM application 118 to send a task to a seventh worker "Linda" to review the proposed specification change. Linda accesses her workflow task in an application interface 120 that suits her and is appropriate for her role. Linda selects the subject task, the MES system 112 retrieves the specification information for the subject production process and other relevant information, possibly historical information about line operation retrieved from a historian application, and presents this information to Linda.

Linda may reject the change request or accept the change request. If Linda rejects the change request, she enters comments and closes the form. The BPM application 118 sends an email to Bill indicating why the change request was not approved and the workflow terminates. If Linda accepts the change request, she enters comments and closes the form. The BPM application 118 sends a task to an eighth worker "Nancy" to review the proposed change. Nancy accesses her task via an application interface 120 that suits her. When Nancy selects the subject task, the MES application 112 retrieves specification and related information, as described above, and presents this information to Nancy. Nancy may reject or approve the change request. If Nancy rejects the change request, she enters comments and closes the form and the workflow terminates. If Nancy accepts the change request, she enters comments in the form and closes the form. Relevant information is sent to the PLM application 114 to update the specification, an API on the MES application 112 is invoked to update the version of the specification stored locally, for example on the system that Bill interacts with. An email is sent to both Bill and Linda indicating the change request was approved and the workflow terminates.

It is understood that the above use scenarios are examples of a wide range of scenarios supported by the system 100. Actions that are described as being performed by specific actors—for example specific applications 110, 112, 114, 116, 118—in a different embodiment may be performed by a different application. While specific workers are referred to by name in the above use scenarios, it is understood that the workflows may instead be defined in terms of roles and tasks assigned to individuals associated with the subject role based on current workloads of all individuals associated with the subject role, work schedules of the individuals, and other considerations. For example, in the first use scenario, rather than a workflow definition identifying the second worker "John" specifically, the workflow definition may instead identify a role of a quality inspector. If a task is assigned to a quality inspector on a first work shift, the task may be assigned to John; while if the task is assigned to a quality inspector on a second work shift, the task may be assigned to Fred. Likewise, if a task is assigned to a quality inspector on the first work shift, and John was assigned the most recent task, the task may be assigned to Chuck. The definition of workflow participants in terms of roles rather than specific individuals makes the workflows more flexible, lowers the maintenance burdens of keeping the workflows up to date, and may more effectively institutionalize uniform processes.

Figure 6:
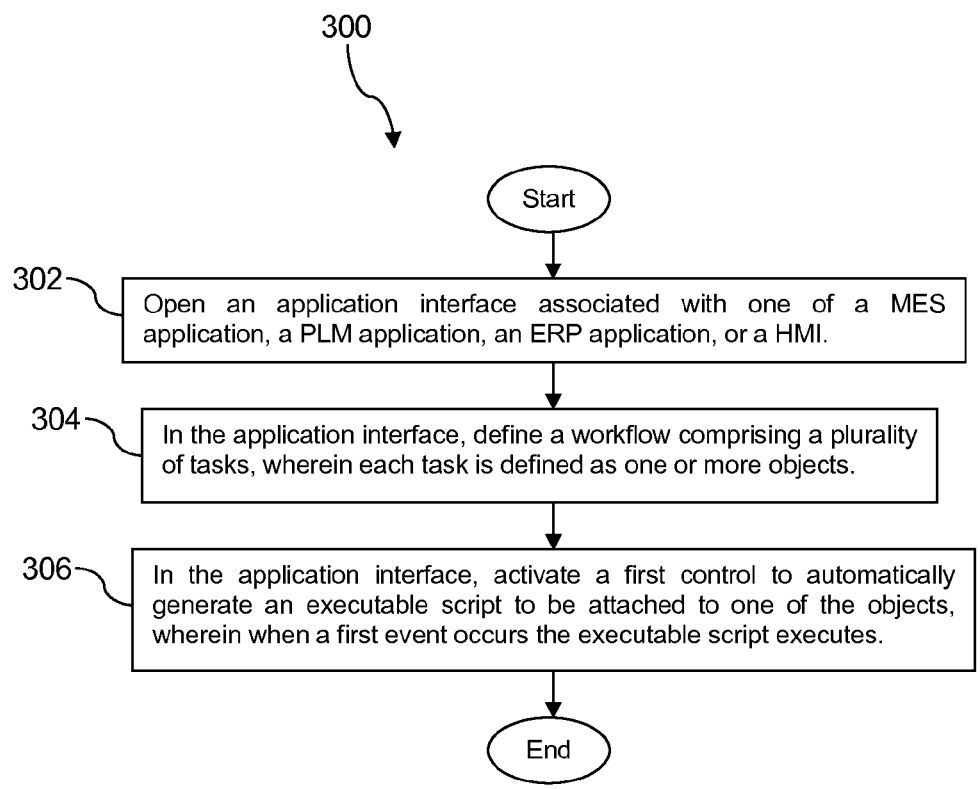
FIG. 6 is a flow chart of a method according to an embodiment of the disclosure.

Turning now to FIG. 6, a method 300 is described. In an embodiment, the method 300 may be used to define a workflow comprised, at least in part, of objects. At block 302, an application interface is opened. The application interface is one of an MES application interface, a PLM application interface, an ERP application interface, or an HMI interface. At block 304, a workflow comprised of a plurality of tasks is defined in the application interface, for example an application interface 120. The application interface 120 may provide one or more controls that may be selected to define one or more parameters or elements of a task, for example a role or an individual that is responsible for performing the task. Each task is defined as one or more objects. At block 306, a first control is activated in the application interface to automatically generate an executable script to be attached to one of the objects comprising the task. In an embodiment, the control may be an event tab associated with a graphical user interface window or dialog box for creating and/or defining an object in the workflow. By clicking on the event tab, an event definition and/or event design window and/or dialog box displays that promotes defining the event trigger. The event may be linked up to other tasks and/or workflows, for example such that the event may cause the other task and/or workflow to launch. Behind the scenes the event is automatically implemented by the system as a script associated with the subject object.

In an embodiment, the application interface invokes application programming interface calls in the BPM application 118 to construct and build the workflow and/or tasks and/or scripts. In some contexts, the functionality that is provided for defining workflow, tasks, and/or scripts may be referred to as a builder and/or a workflow builder. In some contexts, the application interface may be referred to as a workflow builder interface or a workflow builder, because this is how a user may experience defining and/or configuring a workflow. For example, a builder tab presented in a graphical user interface of the application interface that selects display of a workflow builder window or workflow builder graphical user interface. The builder and/or workflow builder functionality may be a part of the BPM application 118. Alternatively, in an embodiment, the builder and/or workflow builder functionality may be a separate application.

In an embodiment, the workflow builder may be implemented in a plant model automation application. In an embodiment, the workflow builder may be implemented in the ArchestrA integrated development environment (IDE). The workflow builder may be used to define a workflow as an object oriented plant model. Thus, different aspects of the plant may be modeled as objects, each object having attributes such as temperature, state, pressure, and/or other values that are meaningful for the subject object. When defining and/or building the subject object using the workflow builder, a tab may be presented by the interface, for example a tab on a graphical user interface window, for configuring an event on the object that is automatically implemented by the workflow builder as a script. The workflow builder promotes defining one or more events associated with a single object, for example events that occur at different thresholds of the value of a particular attribute of the subject object or events that occur related to different attributes of the subject object.

When an event occurs, the executable script executes. Events may occur when control inputs are activated, for example when a machine operator actuates a switch, pushbutton, or selects a button on a user interface. For example, an event may occur when an operator actuates a control of one of the HMIs 106. An event can occur when a monitored value reaches a threshold, exceeds a predefined threshold, or drops below a predefined threshold. An event can occur when a message is received, for example when an electronic message is sent from a first computer to a second computer or for example when a first computer application invokes an application programming interface call of a second computer application, possibly executing on a different computer system. The script may cause a new task to launch or may cause the workflow to terminate. In an embodiment, the scripts raise events to a workflow subsystem, for example the BPM application 118, and the workflow subsystem channelizes those events to appropriate workflows. The script may cause other functionality to occur as well. For example, the script may cause automated actions to occur such as logging or storing of process data.

The user that interacts with the subject application interface may have not knowledge that activating the first control causes a script to be automatically generated and attached to the subject object. The functionality of the application interface hides this detail from the user who may be a non-technical person who knows little about computer coding and may be intimidated or put-off by computer coding actions. In an embodiment, the control may comprise a tab in a graphical user interface that permits definition of an event. behind the scenes, the event that is defined using the graphical user interface is mapped by the application interface 120 to a script associated with the subject object. The support for creating the event handling script via the application interface 120 may be said to change what is traditionally a programming activity performed by specialized programmers or coders into a configuration activity.

In an embodiment, the objects defined using the application interface 120 to define a task and/or workflow may be configured to interact with a proxy device such as a proxy server. When the object is instantiated it may communicate with a proxy server that directs the communication to a specific workflow server and/or BPM server. This proxy server may conduct this activity to balance workloads among workflow servers or based on other criteria.

The use of scripting to provide event behavior instead of modeling events as objects in their own right, as might be expected in an object oriented workflow application such as the BPM application 118, is somewhat unorthodox. For example, in a pure object oriented design approach it would be conventional to model events as objects and dynamically instantiate a new object for each event that occurs. The approach of reflecting events not by dynamically instantiating event objects but instead by executing scripts avoids the dynamic generation and propagation of event objects that might overwhelm the system 100 and/or overwhelm communications over the network 108. The concern for avoiding unpredictable event object instantiation floods is further validated by the consideration that it is typical that systems such as system 100 grow over time. Thus, even if the system 100 were tested on deployment and was determined by test at that time to have a low probability of suffering from an event object instantiation flood, this would not guarantee that as the system 100 grows over time—as new plants are brought into service and integrated into the BPM application 118—that such an event object instantiation flood would not cripple the system 100 in the future. It is thought that the innovation of using scripts to implement events in object based and/or object oriented system, for example in the system 100 and/or the BPM application 118, promotes robust scaling of the integrated workflow system.

Figure 7:
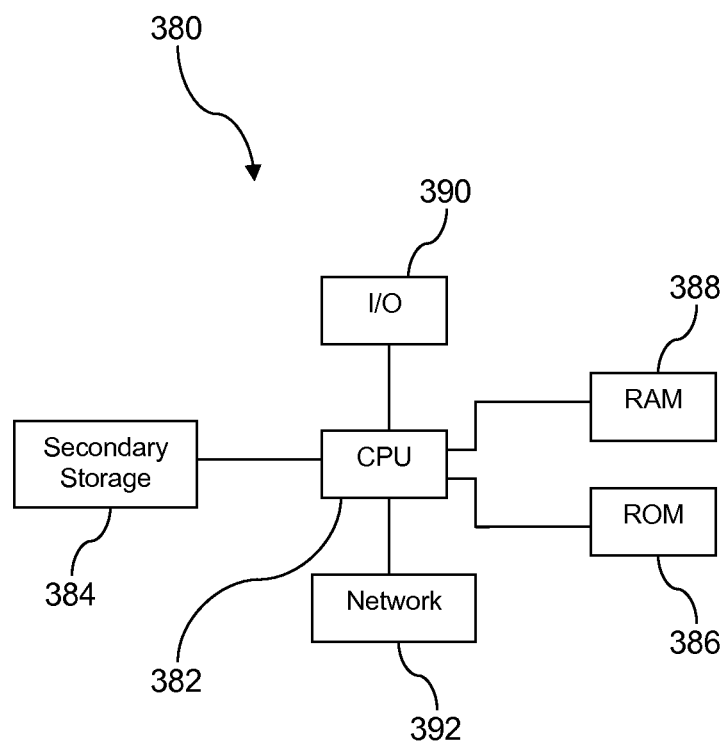
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as non-transitory storage and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:
 a first computer system located at a first plant;
 a first memory;
 a first object based business process management (BPM) application stored in the first memory that, when executed by the first computer system,
  automatically executes a first workflow that receives a first input from a human machine interface (HMI) in a first plant,
  in response to the first input launches a first event, wherein the first event is associated with a first script and wherein launching the first event causes the first script to be executed, the first script assigns a first task associated to a first functional role performed at the first plant,
  receives a second input associated with the first task,
  in response to the second input launches a second event, wherein the second event is associated with a second script and wherein launching the second event causes the second script to be executed, the second script transmits a request to launch a second task,
  accesses a first business process management data store located in the plant, and presents first contextual information accessed from the first business process management data store on a display associated with the first functional role;
a second computer system located separate from the first plant;
a second memory;
a second object based business process management application stored in the second memory that, when executed by the second computer system,
automatically executes a second workflow that receives the request to launch the second task,
assigns the second task associated to a second functional role performed at the office separate from the first plant,
receives a third input associated with the second task,
in response to the third input transmits information to the human machine interface that changes the process mediated by the human machine interface in the first plant,
accesses a second business process management data store located at an office separate from the first plant, and
presents second contextual information accessed from the second business process management data store on a display associated with the second functional role,
wherein the first contextual information is not stored in the second business process management data store and wherein the tasks associated with the first workflow are identified as those that take place at the first plant.

2. The system of claim 1, wherein some information stored in the first business process management data store is copied to the second business process management data store periodically.

3. The system of claim 1, further comprising a workflow builder stored in a memory that, when executed on a computer system, provides a first control for defining an object that comprises a portion of a task and provides a second control for defining an event associated with the object, wherein the second control automatically generates a script definition that becomes part of the object definition, where the script executes when the event occurs.

4. The system of claim 3, wherein the script launches a different task.

5. The system of claim 3, wherein the workflow builder provides a third control for identifying a context of the event to transport to the different task launched by the script.

6. The workflow builder of claim 5, wherein the context of the event comprises at least one of current sensed value associated with the object, a time of the event, or a location of the event.

7. A system, comprising:
a computer system;
an at least one memory;
an application stored in the at least one memory that, when executed by the computer system,
automatically executes a first workflow that receives a first input from a human machine interface (HMI) in a first plant,
in response to the first input generates a first event that assigns a first task associated to a first functional role performed at the first plant,
receives a second input associated with the first task,
in response to the second input generates a second event that assigns a second task associated to a second functional role performed at an office separate from the first plant and generates a request to launch the second task,
automatically executes a second workflow that receives the request to launch the second task,
assigns the second task associated to the second functional role performed at the office separate from the first plant,
receives a third input associated with the second task,
in response to the third input transmits information to the human machine interface that changes the process mediated by the human machine interface in the first plant,
wherein the application generates the first event by executing a first script associated with a first instantiated object that receives the first input and generates the second event by executing a second script associated with a second instantiated object that receives the second input;
wherein the application when executed by the computer system,
accesses a first data store related to the first plant, and
presents first contextual information accessed from the first data store on a display associated with the first functional role;
accesses a second data store related to the office separate from the first plant, and
presents second contextual information accessed from the second data store on a display associated with the second functional role; and
wherein the first contextual information is not stored in the second data store and wherein the tasks associated with the first workflow are identified as those that take place at the first plant.

8. The system of claim 7, wherein the first input is a request to change a process specification.

9. The system of claim 7, wherein the first input indicates that a job has been completed.

10. The system of claim 7, wherein the human machine interface presents a first context and wherein the first input is based on the first context, wherein the first task is handled in a second interface that presents a second context and wherein the second input is based on the second context.

11. The system of claim 7, wherein the first script launches the first task.

12. A system, comprising:
a computer system;
an at least one memory;
an application stored in the at least one memory that, when executed by the computer system,
automatically executes a first workflow that receives a first input from a human machine interface (HMI) in a first plant,
in response to the first input generates a first event that assigns a first task associated to a first functional role performed at the first plant,
receives a second input associated with the first task,
in response to the second input generates a second event that assigns a second task associated to a second functional role performed at an office separate from the first plant and generates a request to launch the second task,
automatically executes a second workflow that receives the request to launch the second task,
assigns the second task associated to the second functional role performed at the office separate from the first plant,
receives a third input associated with the second task, in response to the third input transmits information to the human machine interface that changes the process mediated by the human machine interface in the first plant,
wherein the application generates the first event by executing a first script associated with a first instantiated object that receives the first input and generates the second event by executing a second script associated with a second instantiated object that receives the second input;
wherein the first script launches the first task and the second script launches the second task;
wherein the human machine interface presents a first context and wherein the first input is based on the first context;
wherein the first task is handled in a second interface that presents a second context and wherein the second input is based on the second context;
wherein the application when executed by the computer system,
   accesses a first data store related to the first plant, and
   presents first contextual information accessed from the first data store on a display associated with the first functional role;
   accesses a second data store related to the office separate from the first plant, and
   presents second contextual information accessed from the second data store on a display associated with the second functional role; and
   wherein the first contextual information is not stored in the second data store and wherein the tasks associated with the first workflow are identified as those that take place at the first plant.

13. A system, comprising:
a computer system;
an at least one memory;
an application stored in the at least one memory that, when executed by the computer system,
   automatically executes a workflow that receives a first input from a human machine interface (HMI) in a first plant,
   in response to the first input generates a first event that assigns a first task associated to a first functional role performed at the first plant,
   receives a second input associated with the first task,
   in response to the second input generates a second event that assigns a second task associated to a second functional role performed at an office separate from the first plant,
   accesses a first data store related to the first plant, and
   presents first contextual information accessed from the first data store on a display associated with the first functional role;
   accesses a second data store related to the office separate from the first plant, and
   presents second contextual information accessed from the second data store on a display associated with the second functional role,
   receives a third input associated with the second task,
   in response to the third input transmits information to the human machine interface that changes the process mediated by the human machine interface in the first plant,
wherein the application generates the first event by executing a first script associated with a first instantiated object that receives the first input and generates the second event by executing a second script associated with a second instantiated object that receives the second input, and
wherein the first contextual information is not stored in the second data store and wherein the tasks associated with the workflow are identified as those that take place at the first plant.

* * * * *